United States Patent
Altinger et al.

(10) Patent No.: US 10,417,905 B2
(45) Date of Patent: Sep. 17, 2019

(54) METHOD FOR PROVIDING RESULT DATA THAT DEPEND ON A MOTOR VEHICLE ENVIRONMENT

(71) Applicant: Audi AG, Ingolstadt (DE)

(72) Inventors: Harald Altinger, Gerolfing (DE); Florian Schuller, Ismaning (DE); Christian Feist, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/065,728

(22) PCT Filed: Dec. 4, 2017

(86) PCT No.: PCT/EP2017/081392
§ 371 (c)(1),
(2) Date: Jun. 22, 2018

(87) PCT Pub. No.: WO2018/104239
PCT Pub. Date: Jun. 14, 2018

(65) Prior Publication Data
US 2019/0012906 A1    Jan. 10, 2019

(30) Foreign Application Priority Data
Dec. 8, 2016   (DE) ........................ 10 2016 224 510

(51) Int. Cl.
*G08G 1/01* (2006.01)
*B62D 15/02* (2006.01)
(Continued)

(52) U.S. Cl.
CPC ....... *G08G 1/0112* (2013.01); *B62D 15/0285* (2013.01); *G05D 1/0276* (2013.01);
(Continued)

(58) Field of Classification Search
CPC ........ G05D 2201/0212; B62D 15/0285; B60Q 1/48; G08G 11/14; G07B 15/06; B60R 2300/806
(Continued)

(56) References Cited

U.S. PATENT DOCUMENTS 9,963,106 B1 * 5/2018 Ricci .................... B60R 25/2018
2002/0163444 A1 * 11/2002 Budnovitch ............. B60Q 1/48
340/932.2
(Continued)

FOREIGN PATENT DOCUMENTS

DE   102008028550 A1   12/2009
DE   102008042565 A1   4/2010
(Continued)

OTHER PUBLICATIONS

English-language abstract of German Patent Application Publication No. DE 102008028550 A1, published Dec. 17, 2009; 1 page.
(Continued)

*Primary Examiner* — Emily C Terrell
(74) *Attorney, Agent, or Firm* — Sterne, Kessler, Goldstein & Fox P.L.L.C.

(57) ABSTRACT

A method and apparatus are described for providing result data, which relate to a motor vehicle environment with an infrastructure device, for guiding a receiving motor vehicle through an infrastructure presenting a complex traffic situation. At least one motor vehicle having at least one sensor device is selected by the infrastructure device. The sensor device of the selected motor vehicle detects sensor data, which describe at least part of the motor vehicle environment. The infrastructure device transmits a query message to the selected motor vehicle. The selected motor vehicle transmits the sensor data to the infrastructure device in response to the query message. The infrastructure device
(Continued)

determines result data from the sensor data and provides the result data to the receiving motor vehicle.

18 Claims, 2 Drawing Sheets

(51) Int. Cl.
  *G08G 1/0967* (2006.01)
  *G08G 1/14* (2006.01)
  *G05D 1/02* (2006.01)
  *H04W 4/44* (2018.01)

(52) U.S. Cl.
  CPC ......... *G08G 1/0133* (2013.01); *G08G 1/0141* (2013.01); *G08G 1/096725* (2013.01); *G08G 1/096733* (2013.01); *G08G 1/096741* (2013.01); *G08G 1/096775* (2013.01); *G08G 1/096783* (2013.01); *G08G 1/143* (2013.01); *G08G 1/146* (2013.01); *G05D 2201/0213* (2013.01); *H04W 4/44* (2018.02)

(58) Field of Classification Search
  USPC ....................................................... 340/932.2
  See application file for complete search history.

(56) References Cited

U.S. PATENT DOCUMENTS

| 2006/0267799 | A1* | 11/2006 | Mendelson | G08G 1/14 340/932.2 |
|---|---|---|---|---|
| 2015/0170518 | A1* | 6/2015 | Rodriguez Garza | G08G 1/144 340/932.2 |
| 2015/0241880 | A1 | 8/2015 | Kim et al. | |
| 2015/0279210 | A1* | 10/2015 | Zafiroglu | G08G 1/065 340/932.2 |
| 2015/0324744 | A1 | 11/2015 | Fokkelman | |
| 2017/0101097 | A1 | 4/2017 | Buchner et al. | |
| 2018/0025640 | A1* | 1/2018 | Micks | G09B 9/54 340/932.2 |
| 2018/0052860 | A1* | 2/2018 | Hayes | H04W 4/029 |
| 2018/0053422 | A1 | 2/2018 | Altinger et al. | |

FOREIGN PATENT DOCUMENTS

| DE | 102012223152 A1 | 6/2014 |
|---|---|---|
| DE | 102013220312 A1 | 4/2015 |
| DE | 102014212478 A1 | 12/2015 |
| DE | 102014214505 A1 | 1/2016 |
| DE | 102015002405 A1 | 8/2016 |
| WO | WO 2016/138942 A1 | 9/2016 |

OTHER PUBLICATIONS

English-language abstract of German Patent Application Publication No. DE 102008042565 A1, published Apr. 8, 2010; 6 pages.
English-language abstract of German Patent Application Publication No. DE 102013220312 A1, published Apr. 9, 2015; 6 pages.
English-language abstract of German Patent Application Publication No. DE 102014214505 A1, published Jan. 28, 2016; 6 pages.
International Search Report and Written Opinion of the International Searching Authority directed to related International Patent Application No. PCT/EP2017/081392, dated Feb. 26, 2018, with attached English-language translation of Annex; 14 pages.

* cited by examiner

METHOD FOR PROVIDING RESULT DATA THAT DEPEND ON A MOTOR VEHICLE ENVIRONMENT

TECHNICAL FIELD

This disclosure relates to a method for providing result data that depend on a motor vehicle environment of a receiving motor vehicle, from an infrastructure device to the receiving motor vehicle. In addition, this disclosure relates to a motor vehicle and an infrastructure device.

BACKGROUND

For a great number of driver assistance systems, a detailed detection of the environment is essential. If a fully automated drive mode is supposed to be executed, which can be executed particularly without the presence of the driver in the motor vehicle, this is only possible if exact information about the motor vehicle environment is available. If the environment is supposed to be detected with sufficient precision exclusively by the vehicle's own sensors, a highly elaborate sensor system is required. In addition, complex driving situations are possible, during which basically no sufficient detection of the environment solely by the vehicle's own sensor system is possible because, for example, certain environmental areas can be concealed. This problem, for example, is highly relevant in case of an automatic guidance of motor vehicles through parking garages and underground parking facilities, because in them, relevant areas can be concealed by walls, pillars, and/or other motor vehicles.

It is therefore known to receive and analyze sensor data from other motor vehicles or infrastructure devices. For example, document DE 10 2008 042 565 A1 discloses a method for operating a driver assistance device, wherein sensor data about a traffic situation are provided to the driver assistance device by at least one external device. These can be provided by sensors of other vehicles or by infrastructure devices.

A similar approach is also known from document DE 10 2014 214 505 A1. According to this document, sensor data primarily from the vehicle's own sensor systems are used for generating an environment model, but sensor data from other vehicles or infrastructural sensor systems can also be used.

The described approach is disadvantageous because the motor vehicle itself is supposed to detect relevant data sources and analyze the data provided by said sources. However, in complex driving situations, it can be relatively elaborate to detect which sensor data are even relevant for a given driving situation. As a result, a multiplicity of irrelevant sensor information must also be processed. Thus, the processing workload in the vehicle increases, which, in some circumstances, can also lead to extended response times by driver assistance systems that analyze said sensor data. In addition, sensor data from other vehicles can only be provided if their sensors are also operated. Usually, this is not the case with parked motor vehicles in underground or other parking garages. As a result, typically only the sensor data from infrastructural sensors are available as external sensor data in corresponding driving situations.

BRIEF DESCRIPTION OF THE DRAWINGS/FIGURES

The accompanying drawings, which are incorporated herein and form part of the specification, illustrate the present embodiments and, together with the description, further serve to explain the principles of the present embodiments and to enable a person skilled in the relevant art(s) to make and use the present embodiments.

Figure 1:
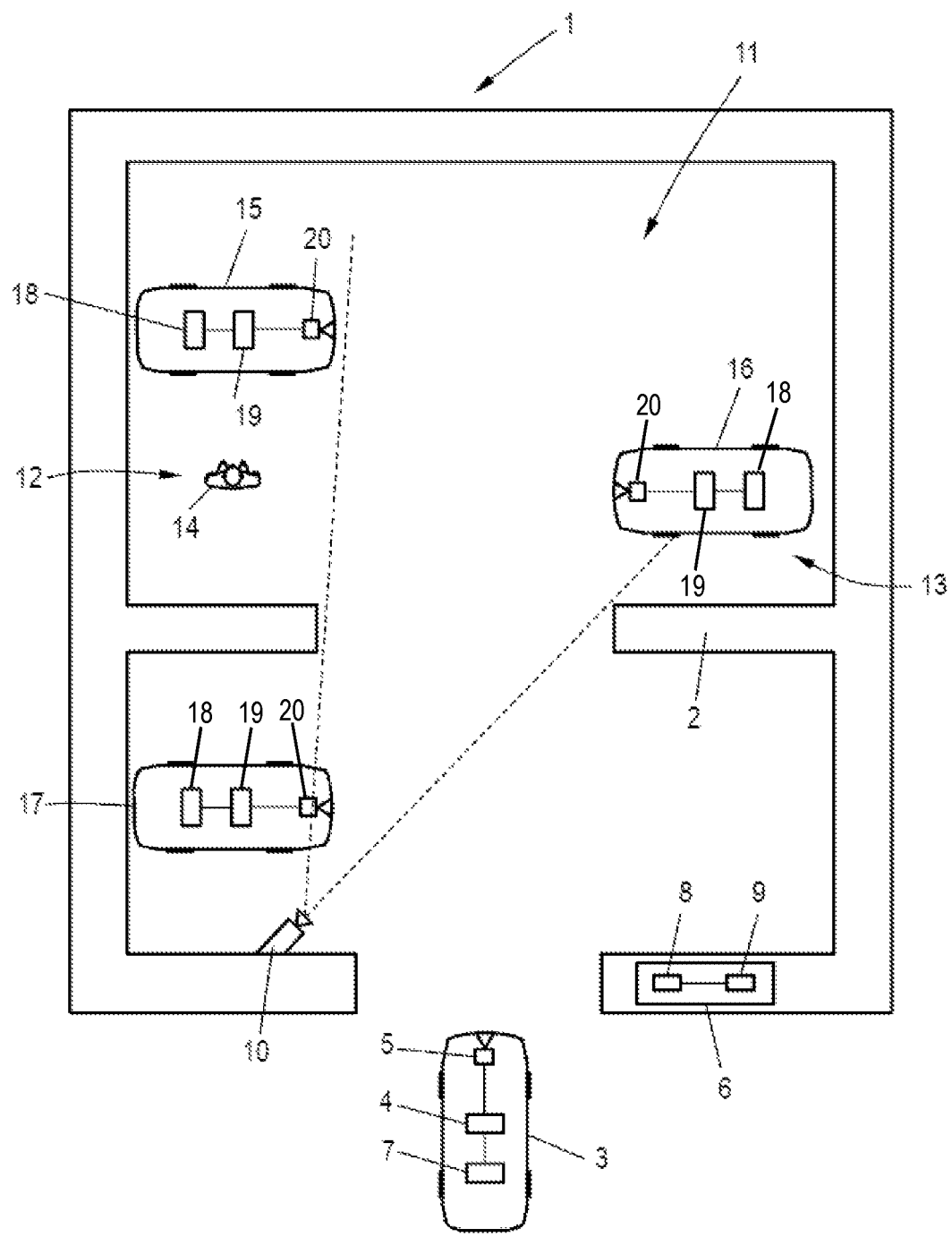
FIG. 1 illustrates a driving situation of a motor vehicle environment, according to some embodiments.

The features and advantages of the present embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

The method disclosed herein addresses the problem of improving the detection of the motor vehicle environment particularly in complex traffic situations.

The problem is solved by a method including the following steps:

selection, by the infrastructure device, of at least one selected motor vehicle that has at least one sensor device, by means of which at least a part of the motor vehicle environment is detectable;

transmission of a query message to the selected motor vehicle by the infrastructure device;

detection of sensor data, which describe at least parts of the motor vehicle environment, by the sensor device of the selected vehicle, and transmission of the sensor data, or processing data determined from the sensor data by a processing device of the selected motor vehicle, by the selected motor vehicle to the infrastructure device, when the query message is received by the selected motor vehicle; and provision of the result data to the receiving motor vehicle by the infrastructure device, wherein the result data include the sensor data or the processing data, or are determined from the same.

The infrastructure device selects the motor vehicles or the sensor devices, with which the sensor data for the receiving motor vehicle are detected. In addition, these sensor data or data derived therefrom are not directly transmitted from the selected motor vehicle to the receiving motor vehicle but are transmitted by the infrastructure device. This data transmission is initiated by a query message of the infrastructure device.

The method allows for a significantly simpler design of the receiving motor vehicle because the infrastructure device selects the data sources, making a reduction of the complexity of the provided information possible, and the infrastructure device can already process large parts of the sensor data. For example, in the method, a complete environment model can already be provided as result data for the receiving motor vehicle. In a development of the method, it is also possible that control commands can be transmitted as result data directly to the motor vehicle, and so an automatic vehicle operation of the motor vehicle is substantially controllable by the infrastructure device. The method thus makes it possible to provide complex processing functions for the receiving motor vehicle without having to implement them in the receiving motor vehicle itself.

Because the communication with the selected vehicle is initiated in the method by a query message, it is possible, as shall be explained in more detail later in this specification, to activate further systems of the selected vehicle, particularly the sensor device and an associated processing device, only after a query message is received. Particularly in cases in which the selected motor vehicle is not operated, for example, is parked, this can lead to a significant energy conservation.

In a development of the method, it is possible that the infrastructure device first verifies whether a use of a sensor device of a selected motor vehicle is at all necessary. For that purpose, it can first be verified which sections of the motor vehicle environment can be detected, or can be detected with sufficient accuracy, by an infrastructural sensor system or the sensor system of the receiving motor vehicle. If all relevant areas can be detected, it is possible to not select a motor vehicle and to transmit no query message to a selected motor vehicle. However, if it is determined that further information about the motor vehicle environment is required, the selected motor vehicle, as described above, can be selected, and a query message can be sent to said motor vehicle.

The selected motor vehicle can be selected on the basis of a predicted trajectory and/or a position of the receiving motor vehicle. In addition, it can be selected on the basis of, for example, the detection area of the sensor device previously transmitted to the infrastructure device, or on the basis of a previously transmitted position and/or orientation of the selected motor vehicle. The selected motor vehicle can be selected from a predetermined number of motor vehicles which, as shall be explained in more detail later in this specification, can be determined automatically by the infrastructure device.

In the method, conventional file formats or protocols can be used for the data exchange. The receiving motor vehicle and/or the selected motor vehicles can communicate with the infrastructure device by means of a Car2X communication, for example, via WLAN or similar local data networks. Sensor data, for example, can be transmitted as image data or in any other data format. The sensor device can be a camera, a radar sensor, a Lidar sensor, an ultrasound sensor, or a laser scanner, for example. It can also include a plurality of similar or different sensors.

For providing the processing data, the processing device can execute particularly an object recognition in the sensor data to detect objects and/or their properties, for example, their speeds and/or positions.

A parked motor vehicle can be selected as the selected motor vehicle. In particular, the motor vehicle can be parked in a defined parking position, for example, a parking garage or an underground parking facility. It is possible that a drive device of the motor vehicle is deactivated and/or that the onboard power supply of the motor vehicle is set to be at least partially free of current.

The sensor device and/or the processing device of the selected motor vehicle, prior to receiving the query message, is/are operated in a passive mode of operation, in which no detection and/or processing of the sensor data is possible. Then, the sensor device and/or the processing device, after receiving the query message, can be switched to an active mode of operation to detect and/or process the sensor data. Alternatively, the sensor device and/or the processing device can be inactive, wherein the sensor device and/or the processing device, after receiving the query message, can similarly be switched to an active mode of operation to detect and/or process the sensor data. It is particularly possible that the energy consumption of the sensor device and/or the processing device is lower in the passive mode of operation than in the active mode of operation. In particular, the sensor device and/or the processing device can be free of current prior to receiving the query message. The query message can thus also be used to activate further devices of the selected motor vehicle to allow for a data acquisition. As a result, the energy consumption can be reduced, particularly if parked motor vehicles are used as selected motor vehicles.

Prior to the selection of the selected motor vehicle, a plurality of motor vehicles present in an area associated with the infrastructure device can be determined by the infrastructure device, whereupon the selected motor vehicle is selected from the motor vehicles present. For example, the infrastructure device can be associated with an underground parking facility or a parking garage, or a specific parking level of an underground parking facility or a parking garage, wherein all those motor vehicles can be detected as motor vehicles present in, or parked inside, the parking garage or the underground parking facility, or parked on the specific parking level.

The motor vehicles present can preferably be determined by transmitting a corresponding logon message to the infrastructure device. The logon message, for example, can be transmitted when the area associated with the infrastructure device is entered. Alternatively or additionally, the logon message can be transmitted when the motor vehicle is parked or its drive device is deactivated. It is also possible that the logon message is transmitted upon a request message of the infrastructure device, wherein the request message, for example, is sent out periodically by the infrastructure device.

The logon message can include a logon information which relates to a current or anticipated future position and/or orientation and/or at least one sensor device of the motor vehicle present, wherein the selected motor vehicle is selected on the basis of the logon information. For example, the logon information can describe a parking spot, in which the motor vehicle is parked or is supposed to be parked. However, it is also possible that driving motor vehicles are selected in the method. These motor vehicles, for example, can regularly transmit their position and/or alignment, particularly in the form of a logon message, to the infrastructure device.

With regard to the sensor device, an alignment of the sensor device relative to the motor vehicle, a type of sensor device, an angle of detection, and/or a range, can be transmitted as logon information.

Alternatively or additionally, it is possible that, in the method, the position and/or orientation of the motor vehicles present or the selected motor vehicle is/are detected by an infrastructural sensor system or by a sensor system of the receiving motor vehicle.

The receiving motor vehicle can be guided automatically by a control device of the receiving motor vehicle on the basis of the result data. For that purpose, the result data can directly describe driving interventions. In such case, actuators of the motor vehicle can be directly controlled by the control device, on the basis of the result data, to intervene in the vehicle operation. Alternatively, the control device itself can determine the necessary driving interventions on the basis of the result data. In such case, the result data can, for example, relate to objects that are supposed to be taken into account during the automatic guidance of the motor vehicle.

The result data can be determined by the infrastructure device on the basis of further sensor data that are detected by at least one further infrastructural sensor device. For example, an environment model can be generated with the sensor data fusion of the infrastructurally detected sensor data and the sensor data detected by the sensor device of the selected motor vehicle. Additionally or alternatively, the result data can depend on sensor data from a plurality of selected motor vehicles.

In addition to the method disclosed herein, this disclosure relates to a motor vehicle having a communication device for communicating with an infrastructure device, at least one sensor device, and a processing device, wherein the sensor device and the communication device are controllable by the processing device such that the motor vehicle as the selected motor vehicle participates or can participate in the method.

The motor vehicle can be developed with the features described for the method as disclosed herein. In particular, it is possible that by means of a control device, the sensor device and/or the processing device, which can also be designed to be a part of the control device, can be put into a power saving mode or deactivated. If a query message is received via the communication device, the corresponding devices can be reactivated.

This disclosure further relates to an infrastructure device having a control device and a communication device, wherein the communication device is controllable by the control device such that the infrastructure device participates or can participate in the method. The infrastructure device can also be developed with the features described for the method.

Figure 2:
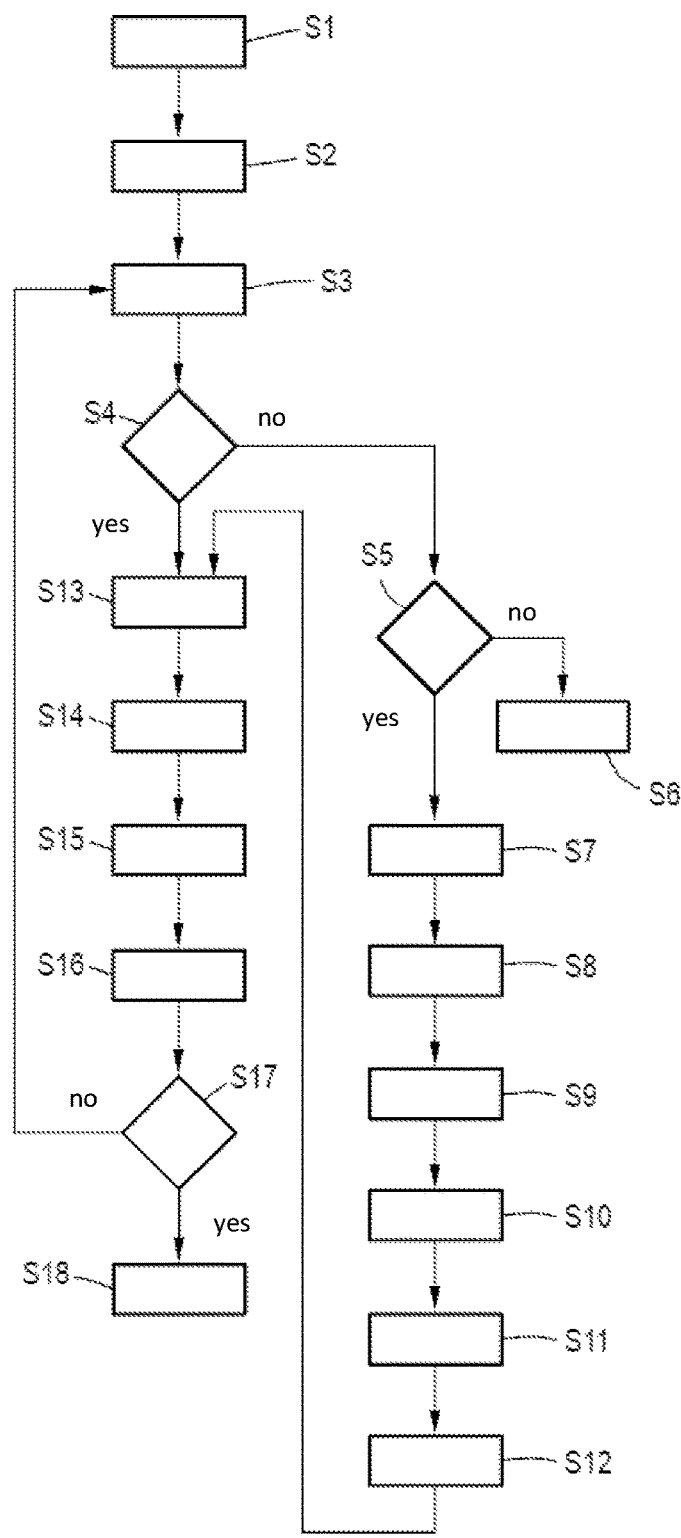
FIG. 2 illustrates a flow chart of a method for providing result data, which depend on the motor vehicle environment of a receiving motor vehicle, from an infrastructure device to the receiving motor vehicle, according to some embodiments.

Further advantages and details of the disclosed method, motor vehicle, and infrastructure device follow from the following embodiments and the corresponding drawings, which show schematically:

in FIG. 1, a driving situation with a plurality of embodiments of a motor vehicle, in which the method disclosed herein can be utilized, and in FIG. 2, a flow chart of an embodiment of the method.

FIG. 1 shows a driving situation, in which a motor vehicle 3 is supposed to be guided to a parking position (not depicted) in a parking garage 1. Due to numerous walls 2, the driving situation in the parking garage 1 is unclear. The motor vehicle 3 is supposed to be guided fully automatically to the parking position without the need for a driver. Due to the unclear driving situation, the motor vehicle 3 is supposed to be guided by an infrastructure device 6, which transmits driving commands via communication devices 7, 8 to the motor vehicle 3. In the described method, the motor vehicle 3 is thus a receiving motor vehicle 3, which receives result data from the infrastructure device 6. Corresponding driving commands are determined by the control device 9 of the infrastructure device 6. After receiving appropriate driving commands, the control device 4 in the motor vehicle controls actuators (not depicted) of the motor vehicle 3 to execute said driving commands.

Such an automatic guidance of the motor vehicle 3 requires highly accurate information about the motor vehicle environment of the motor vehicle 3. The sensor data determined by the motor vehicle sensor device 5 and the further infrastructural sensor device 10 are frequently insufficient. For example, due to the walls 2, the infrastructural sensor device 10 only detects the detection area 11, whereby the areas 12, 13 are concealed. For example, a pedestrian 14, who is located in the area 12 cannot be detected by the infrastructural sensor device 10, and can only be detected relatively late by the motor vehicle sensor device 5.

The environment detection in the depicted driving situation can be improved by also using at least parts of the sensor devices 20 of motor vehicles 15, 16, 17 present in the parking garage 1 for the environment detection. In the following, a corresponding method shall be explained in more detail with reference to the flow chart in FIG. 2.

In step S1, a destination for the motor vehicle 3 is initially determined by the control device 9 of the infrastructure device 6. A destination, for example, can be a free parking spot, to which the motor vehicle 3 is supposed to be guided.

In step S2, environment data are detected by the sensor device 5 of the motor vehicle 3 and the infrastructural sensor device 10, with said environment data describing at least parts of the environment of the motor vehicle 3. Using these environment data, a preliminary trajectory for the motor vehicle 3 is planned in step S3.

In step S4, it is verified whether all relevant environment areas were detected with a sufficient quality. For that purpose, those areas that are crossed by the trajectory, or lie near the trajectory, are compared to those areas that can be detected by the sensor device 5 and the infrastructural sensor device 10. If all these areas can be detected with a sufficient quality, the method can be continued directly with step S13.

However, if this is not the case, it is initially verified in step S5 whether the relevant areas can be detected by the sensor devices 20 of the motor vehicles 15, 16, 17 present. In order to make this possible, the motor vehicles 15, 16, 17 present are logged on in a previous step (not depicted) to the infrastructure device 6. For that purpose, each of the motor vehicles 15, 16, 17 transmits a logon message via its corresponding communication device 18 to the communication device 8 of the infrastructure device 6, when a parking of the motor vehicles 15, 16, 17 is detected, for example, when the corresponding drive device of one of the motor vehicles 15, 16, 17 (not depicted) is deactivated. Said logon message includes a logon information that includes the current position and orientation of the motor vehicles 15, 16, 17 as well as information about the corresponding sensor device 20.

As information regarding the position and orientation, it can be sufficient to determine the specific parking spot in which one of the motor vehicles 15, 16, 17 is parked. However, in addition, it can be determined, for example, by means of the corresponding sensor device 20, how each of the motor vehicles 15, 16, 17 is oriented in relation to the corresponding parking spot. Additionally or alternatively, positional information of a satellite navigation system, for example, or a similar system can be used to determine the logon information.

In an alternative variation of the method, it would also be possible that the logon message is already transmitted to the infrastructure device 6 prior to the parking of the corresponding motor vehicle 15, 16, 17. In such case, the logon information could relate to the parking spot selected by the corresponding motor vehicle 15, 16, 17, or logon information regarding the current position and/or orientation of the corresponding motor vehicle 15, 16, 17 can be transmitted repeatedly to the infrastructure device 6, while the corresponding motor vehicle 15, 16, 17 is moving toward the corresponding parking spot.

With regard to the sensor device 20, an alignment of the corresponding sensor device 20 in relation to the corresponding motor vehicle 15, 16, 17, a type of the corresponding sensor device 20, an angle of detection, and a range can be transmitted. With the aid of this information and the known position and orientation of the corresponding motor vehicle 15, 16, 17, a detection area for the corresponding sensor device 20 or for the corresponding motor vehicle 15, 16, 17 present can be determined by the control device 9 of the infrastructure device 6 and matched with the relevant areas to be detected.

If it is determined in step S5 that even with the aid of the motor vehicles 15, 16, 17 present, not all relevant areas can be detected, the method is continued with step S6, in which the motor vehicle 3 is either guided to a different parking spot, for which a corresponding detection is possible, or a manual parking of the motor vehicle 3 becomes necessary.

However, if it is determined that with the aid of the sensor devices 20 of the motor vehicles 15, 16, 17 present, it is possible to detect all relevant areas, the method is continued with step S7, in which those of the motor vehicles 15, 16, 17 present are selected, the sensor devices 20 of which are supposed to be used for sensor data acquisition. Such a selection is advantageous because, for the parked motor vehicles 15, 16, 17, an energy consumption during parking is supposed to be reduced as much as possible. Therefore, if the sensor devices 20 are not required for the sensor data acquisition, the sensor devices 20 and/or the processing devices 19 of the motor vehicles 15, 16, 17 can be set to be free of current or put into a power saving mode, in which their power consumption is lower than during normal operation. In motor vehicles 15, 16, 17, which were not selected in step S7, this operating condition can be maintained, and so an unnecessary energy consumption is prevented.

In the depicted example, only the motor vehicles 15, 16 are supposed to be selected in order to improve the detection of the areas 12, 13. Therefore, in step S8, query messages are transmitted by means of a request signal by the communication device 8 of the infrastructure device 6 to the corresponding communication device 18 of these motor vehicles 15, 16. The data can be transmitted between the motor vehicles 3, 15, 16, 17 and the infrastructure device 6 by means of a Car2X communication, for example, via WLAN. After the request signal is received by the appropriate communication device 18, the corresponding processing device 19 and the corresponding sensor device 20 are switched in step S9 to an active mode of operation to detect and process the sensor data.

In step S10, a subsequent sensor data acquisition by the sensor devices 20 is executed. In step S11, the detected sensor data are processed in order to recognize objects and their properties. For example, the pedestrian 14 can be detected by the sensor device 20 of the motor vehicle 16. With the processing device 19, it is possible to subsequently perform an object classification to classify the pedestrian 14 as such, and object information about a position, a direction of movement, and a speed of movement of the pedestrian 14 can be determined. In step S12, the corresponding object information is transmitted as processing data to the infrastructure device 6.

In step S13, a data fusion takes place in order to generate an environment model of the motor vehicle 3. For that purpose, sensor data of the sensor device 5 and sensor data of the infrastructural sensor device 10 can be utilized, which are fused with the processing data provided by the motor vehicles 15, 16.

On the basis of the environment model determined in step S13, it is possible in step S14 to calculate a more precise trajectory, which the motor vehicle 3 is supposed to follow, and on the basis of this trajectory, control interventions for the motor vehicle 3 can be calculated that are transmitted to the motor vehicle 3 in step S15. In step S16, the control device 4 of the motor vehicle 3 controls actuators (not depicted) of the motor vehicle 3 to execute said control interventions.

In step S17, it is subsequently verified whether the destination, for example, a parking spot, has already been reached. If this is not the case, the method is repeated starting with step S3.

If the destination was reached, the motor vehicle 3 is parked in step S18 in the parking spot. The motor vehicle 3 transmits, as previously transmitted by the motor vehicles 15, 16, 17, a logon message to the infrastructure device 6, thus making the motor vehicle 3 subsequently available for a sensor data acquisition for other motor vehicles. After the motor vehicle 3 is switched off, individual vehicle systems, for example, the sensor device 5, can also be deactivated. These vehicle systems are reactivated, for example, when a query message is received from the infrastructure device 6.

In alternative embodiments, it is also possible that the infrastructure device 6, instead of control interventions, provides the motor vehicle 3 directly with sensor data or processing data, e.g., an environment model, determined from the infrastructure device 6. These data can be used in the course of an automated or assisted guidance of the motor vehicle 3 or also for driver information.

The invention claimed is:

1. A method for providing, from an infrastructure device to a receiving motor vehicle, result data that depend on a motor vehicle environment of the receiving motor vehicle, comprising:
   determining, by the infrastructure device, an incompleteness of detected areas of the motor vehicle environment using sensor data from at least one infrastructural sensor device;
   selecting, by the infrastructure device, at least one selected motor vehicle that has at least one sensor device, wherein the at least one sensor device detects at least a part of the motor vehicle environment, wherein the selecting is performed in response to determining the incompleteness of detected areas, and wherein the method further comprises:
   transmitting, by the infrastructure device, a query message to the at least one selected motor vehicle; and
   receiving, by the infrastructure device, further sensor data detected by the at least one sensor device, or processing data determined from the further sensor data by a processing device of the at least one selected motor vehicle, in response to transmitting the query message, the further sensor data describing at least the part of the motor vehicle environment;
   determining, by the infrastructure device, the result data from available data comprising at least one of: the sensor data of the at least one infrastructural sensor device, the further sensor data of the at least one selected motor vehicle, and the processing data of the at least one selected motor vehicle; and
   transmitting, by the infrastructure device, the result data to the receiving motor vehicle.

2. The method of claim 1, further comprising:
   selecting, by the infrastructure device, a parked motor vehicle as the at least one selected motor vehicle.

3. The method of claim 1, wherein the receiving of the further sensor data or the processing data includes using a Car2X communication.

4. The method of claim 1, wherein the receiving of the further sensor data or the processing data includes using a WLAN.

5. The method of claim 1, further comprising:
   determining, by the infrastructure device, prior to the selecting of the at least one selected motor vehicle, a plurality of motor vehicles present in an area associated with the infrastructure device, whereupon the at least one selected motor vehicle is selected from the plurality of motor vehicles present.

6. The method of claim 5, further comprising:
receiving, by the infrastructure device, from each of the plurality of motor vehicles present, a corresponding logon message; and
determining, by the infrastructure device, a presence of the each of the plurality of motor vehicles by analyzing the corresponding logon message.

7. The method of claim 6, further comprising:
selecting, by the infrastructure device, the at least one selected motor vehicle on a basis of the corresponding logon message, wherein the corresponding logon message comprises a logon information relating to a current or anticipated future position, an orientation, or the at least one sensor device of the at least one selected motor vehicle.

8. The method of claim 1, wherein the transmitting, by the infrastructure device, the result data to the receiving motor vehicle includes transmitting the result data to a control device of the receiving motor vehicle to guide the receiving motor vehicle on a basis of the result data.

9. A motor vehicle, comprising a communication device for communicating with an infrastructure device, at least one sensor device, and a processing device,
wherein the at least one sensor device and the communication device are configured to be controlled by the processing device, and
wherein the processing device is configured to control the at least one sensor device and the communication device, wherein the motor vehicle is configured to:
if selected, by the infrastructure device, as a selected motor vehicle, detect, by the at least one sensor device, at least a part of a motor vehicle environment of a receiving motor vehicle, wherein the motor vehicle is selected by the infrastructure device in response to a determination by the infrastructure device of an incompleteness of detected areas of the motor vehicle environment using sensor data from at least one infrastructural sensor device;
detect, by the at least one sensor device of the selected motor vehicle, further sensor data that describe at least the part of the motor vehicle environment;
receive, as the selected motor vehicle, from the infrastructure device, a query message;
transmit, as the selected motor vehicle, to the infrastructure device, the further sensor data, or processing data determined from the further sensor data by the processing device, in response to receiving the query message; and
if selected, by the infrastructure device, as the receiving motor vehicle:
receive from the infrastructure device, result data determined from available data comprising at least one of: the sensor data of the at least one infrastructural sensor device of the motor vehicle environment, the further sensor data of the selected motor vehicle, and the processing data of the selected motor vehicle.

10. The motor vehicle of claim 9, further configured to:
operate, prior to receiving the query message, the at least one sensor device or the processing device of the selected motor vehicle, in a passive mode of operation in which no detection or processing of the further sensor data is possible; and
switch, upon receiving the query message, the at least one sensor device or the processing device of the selected motor vehicle to an active mode of operation to detect or process the further sensor data.

11. The motor vehicle of claim 9, further configured to:
operate, prior to receiving the query message, the at least one sensor device or the processing device of the selected motor vehicle in an inactive mode of operation; and
switch, upon receiving the query message, the at least one sensor device or the processing device of the selected motor vehicle to an active mode of operation to detect or process the further sensor data.

12. The motor vehicle of claim 9, further configured to:
transmit a logon message to the infrastructure device, wherein the logon message comprises a logon information relating to a current or anticipated future position, an orientation, or the at least one sensor device of the motor vehicle.

13. The motor vehicle of claim 9, further configured to:
guide itself, as the receiving motor vehicle, by a control device, on a basis of the result data.

14. An infrastructure device, comprising a control device and a communication device, wherein the communication device is configured to be controlled by the control device, and the infrastructure device is configured to:
determine an incompleteness of detected areas of a motor vehicle environment from sensor data received from an infrastructural sensor device;
select at least one selected motor vehicle having at least one sensor device, wherein the selecting is performed in response to determining the incompleteness of detected areas of the motor vehicle environment, and wherein the infrastructure device is further configured to:
transmit a query message to the at least one selected motor vehicle; and
receive further sensor data, or processing data determined from the further sensor data, which describe at least a part of the motor vehicle environment of a receiving motor vehicle, from the at least one sensor device of the at least one selected motor vehicle, in response to transmitting the query message;
determine result data from available data comprising at least one of: the sensor data of the at least one infrastructural sensor device, the further sensor data of the at least one selected motor vehicle, and the processing data of the at least one selected motor vehicle; and
transmit the result data to the receiving motor vehicle.

15. The infrastructure device of claim 14, further configured to:
select a parked motor vehicle as the at least one selected motor vehicle.

16. The infrastructure device of claim 14, further configured to:
determine, prior to the selecting of the at least one selected motor vehicle, a plurality of motor vehicles present in an area associated with the infrastructure device, whereupon the at least one selected motor vehicle is selected from the plurality of motor vehicles present.

17. The infrastructure device of claim 16, further configured to:
receive, from each of the plurality of motor vehicles present, a corresponding logon message; and
determine, from the corresponding logon message, the each of the plurality of motor vehicles present.

18. The infrastructure device of claim 17, further configured to:
    select the at least one selected motor vehicle on a basis of the corresponding logon message, wherein the corresponding logon message comprises a logon information relating to a current or anticipated future position, an orientation, or the at least one sensor device of the at least one selected motor vehicle.

* * * * *